US008518572B2

(12) United States Patent
Kim et al.

(10) Patent No.: US 8,518,572 B2
(45) Date of Patent: Aug. 27, 2013

(54) GRAPHITE/DSA ASSEMBLED ELECTRODE FOR REDOX FLOW BATTERY, METHOD OF MANUFACTURING THE SAME AND REDOX FLOW BATTERY INCLUDING THE SAME

(75) Inventors: Hyung Sun Kim, Seoul (KR); Byung Won Cho, Seoul (KR); Young-Jun Kim, Gyeonggi-do (KR); Ki Jae Kim, Seoul (KR)

(73) Assignees: Korea Institute of Science and Technology, Seoul (KR); Korea Electronics Technology Institute, Gyeonggi-do (KR)

( * ) Notice: Subject to any disclaimer, the term of this patent is extended or adjusted under 35 U.S.C. 154(b) by 376 days.

(21) Appl. No.: 12/901,834

(22) Filed: Oct. 11, 2010

(65) Prior Publication Data
US 2011/0256435 A1 Oct. 20, 2011

(30) Foreign Application Priority Data

Apr. 14, 2010 (KR) .................. 10-2010-0034443

(51) Int. Cl.
*H01M 4/0407* (2010.01)
*H01M 4/044* (2010.01)
*H01M 4/583* (2010.01)

(52) U.S. Cl.
USPC .......... 429/94; 29/623.5; 429/209; 429/231.8

(58) Field of Classification Search
None
See application file for complete search history.

(56) References Cited

U.S. PATENT DOCUMENTS

| 6,509,119 | B1 | 1/2003 | Kobayashi et al. | |
| 2002/0110732 | A1* | 8/2002 | Coustier et al. | 429/144 |
| 2003/0143456 | A1* | 7/2003 | Kazacos et al. | 429/105 |
| 2007/0111101 | A1* | 5/2007 | Ohkubo et al. | 429/232 |
| 2007/0134428 | A1* | 6/2007 | Carlson et al. | 427/419.2 |
| 2008/0199774 | A1* | 8/2008 | Giddey et al. | 429/209 |
| 2009/0117461 | A1* | 5/2009 | Shembel et al. | 429/217 |
| 2009/0288856 | A1* | 11/2009 | Sandoval et al. | 174/126.2 |
| 2010/0003545 | A1 | 1/2010 | Horne et al. | |
| 2010/0047671 | A1* | 2/2010 | Chiang et al. | 429/50 |

OTHER PUBLICATIONS

Zhu, H.Q., et al., "Graphite—carbon nanotube composite electrodes for all vanadium redox flow battery", Journal of Power Sources, 184, 2008, pp. 637-640.
Qian, P., et al., "A novel electrode-bipolar plate assembly for vanadium redox flow battery applications", Journal of Power Sources, 175, 2008, pp. 613-625.

* cited by examiner

*Primary Examiner* — Ula C. Ruddock
*Assistant Examiner* — Alix Echelmeyer
(74) *Attorney, Agent, or Firm* — Ladas & Parry LLP (57) ABSTRACT

Disclosed is a graphite/DSA assembled electrode for a redox flow battery, obtained by assembling a graphite electrode made of micro-sized graphite and a DSA electrode using rolling thus improving cell performance including electrode durability, corrosion resistance, power density, energy efficiency and cycle properties. A method of manufacturing the graphite/DSA assembled electrode is also provided, which includes preparing a mixture composed of a graphite active material, a conductive material and a binder into a slurry using an alcohol, evaporating the alcohol from the slurry thus preparing a paste, thinly spreading the paste into an electrode sheet, and rolling the electrode sheet along with a DSA electrode thus obtaining the assembled electrode. A redox flow battery including the electrode thus obtained is also provided, which has increased electrode durability and corrosion resistance and enhanced power properties, energy efficiency and cycle performance.

14 Claims, 10 Drawing Sheets

GRAPHITE/DSA ASSEMBLED ELECTRODE FOR REDOX FLOW BATTERY, METHOD OF MANUFACTURING THE SAME AND REDOX FLOW BATTERY INCLUDING THE SAME

CROSS-REFERENCE TO RELATED APPLICATIONS

This application claims priority from Korean Patent Application No. 10-2010-0034443, filed on Apr. 14, 2010, in the Korean Intellectual Property Office, the disclosure of which is incorporated herein by reference in its entirety

BACKGROUND OF THE INVENTION

1. Field of the Invention

The present invention relates to a graphite/DSA assembled electrode for a redox flow battery, a method of manufacturing the same, and a redox flow battery including the same.

2. Description of the Related Art

Conventional electrodes of redox flow batteries are mainly composed of a carbon-based material such as carbon glass, carbon fiber, carbon felt, graphite fiber, graphite felt or the like. In order to enhance the electrochemical activity of these electrodes and to increase the energy efficiency and durability thereof, the surface of the electrode may be modified using acidic treatment or thermal treatment, or may be subjected to an ion exchange resin process so that the surface of the carbon-based electrode is coated with a noble metal such as gold (Au), platinum (Pt), ruthenium (Ru), iridium (Ir) or the like, or a metal such as palladium (Pd), manganese (Mn), indium (In) or the like.

Although the electrodes thus obtained have superior electrochemical properties and durability, they are disadvantageous because the manufacturing process thereof is complicated and the manufacturing cost becomes high.

SUMMARY OF THE INVENTION

Accordingly, the present invention has been made keeping in mind the problems encountered in the related art and the present invention is intended to provide a graphite/DSA assembled electrode for a redox flow battery, in which a graphite electrode made of micro-sized graphite and a DSA electrode are assembled together using rolling thus improving cell performance including electrode durability, corrosion resistance, power density, energy efficiency, cycle properties and so on, and also to provide a method of manufacturing the same and a redox flow battery including the same.

An aspect of the present invention provides a method of manufacturing a graphite/DSA assembled electrode for a redox flow battery, comprising preparing a mixture comprising a graphite active material, a conductive material and a binder into a slurry using an alcohol, evaporating the alcohol from the slurry, thus preparing a paste, thinly spreading the paste, thus preparing an electrode sheet, and rolling the electrode sheet along with a DSA electrode, thus obtaining the graphite/DSA assembled electrode.

In this aspect, the graphite active material may comprise spherical graphite particles, lamellar graphite particles, fiber-shaped graphite particles, or flaky graphite, each of which has electrochemical activity.

In this aspect, the graphite active material may have a size ranging from 100 nm to 100 μm.

In this aspect, the conductive material may comprise carbon black, carbon nanotubes, graphene, acetylene black, Ketjen black, super-P, or particulate graphite including KS6, sfg6.

In this aspect, the DSA electrode may be a titanium (Ti) mesh substrate which is coated with a material having electrochemical activity, including a noble metal including Ir, Ru, Ta, Pt, Au, Pd or In or an oxide thereof.

In this aspect, the binder may comprise polytetrafluoroethylene (PTFE), polyvinylidene difluoride (PVdF), carboxy methylcellulose (CMC), polyvinylalcohol (PVA), or styrene butadiene rubber (SBR).

In this aspect, the conductive material may be used in an amount of 1~50 wt %, and the binder may be used in an amount of 1~20 wt %.

In this aspect, the alcohol may comprise ethanol, methylalcohol, isopropylalcohol, or an organic solvent blend of the ethanol, methylalcohol, or isopropylalcohol and acetone.

As such, the alcohol and another organic solvent of the organic solvent blend may be mixed at a volume ratio of 50:50.

The organic solvent blend may be used in an amount 0.5~10 times the weight amount of the mixture comprising the graphite active material, the conductive material and the binder.

Another aspect of the present invention provides a graphite/DSA assembled electrode for a redox flow battery, manufactured using the method comprising preparing a mixture comprising a graphite active material, a conductive material and a binder into a slurry using an alcohol, evaporating the alcohol from the slurry, thus preparing a paste, thinly spreading the paste, thus preparing an electrode sheet, and rolling the electrode sheet along with a DSA electrode, thus obtaining the graphite/DSA assembled electrode.

A further aspect of the present invention provides a redox flow battery using the graphite/DSA assembled electrode for a redox flow battery manufactured via the method comprising preparing a mixture comprising a graphite active material, a conductive material and a binder into a slurry using an alcohol, evaporating the alcohol from the slurry, thus preparing a paste, thinly spreading the paste, thus preparing an electrode sheet, and rolling the electrode sheet along with a DSA electrode, thus obtaining the graphite/DSA assembled electrode.

The DSA electrode may be manufactured by acid-washing a Ti mesh with sulfuric acid or hydrochloric acid, thermally treating the Ti mesh, which was acid-washed, at 400° C. for 30 hours in air, dipping the Ti mesh, which was thermally treated, in a solution of 10 wt % $H_2IrCl_6$ in ethanol for 2 min and performing drying in a vacuum oven, and thermally treating the Ti mesh, which was dried, at 450° C. for 15 min in air and performing cooling.

The dipping the titanium mesh and performing drying and the thermally treating the titanium mesh and performing cooling may be repeated eight times, thus manufacturing the DSA electrode.

BRIEF DESCRIPTION OF THE DRAWINGS

The features and advantages of the present invention will be more clearly understood from the following detailed description taken in conjunction with the accompanying drawings, in which.

DETAILED DESCRIPTION OF THE INVENTION

Hereinafter, a detailed description will be given of the present invention with reference to the appended drawings.

According to the present invention, a graphite electrode for a redox flow battery is manufactured by mixing micro-sized graphite, carbon black and polytetrafluoroethylene (PTFE) particles at a weight ratio (wt %) of 90:5:5. As such, carbon black functions as a conductive material for increasing electrical conductivity of the electrode and PTFE is used as a binder of the electrode, and the weight ratio may vary depending on the type of electrode material.

Examples of graphite of the graphite electrode may include spherical graphite particles, lamellar graphite particles, fiber-shaped graphite particles, and flaky graphite particles, each of which has electrochemical activity. Furthermore, the distribution of the graphite particles may range from 100 nm to 100 μm. However, the present invention is not limited thereto, and any type of carbon-based electrode active material known to those ordinarily skilled in the art may be used.

Examples of the conductive material may include but are not limited to, not only carbon black, but also carbon nanotubes, graphene, Ketjen black, super-P, vulcan, and artificial graphite (KS6, sfg6). The conductive material may be used in an amount of 1~50 wt %.

Examples of the polymer binder may include but are not limited to, not only PTFE, but also polyvinylidene difluoride (PVdF), carboxyl methylcellulose (CMC), polyvinylalcohol (PVA), and styrene butadiene rubber (SBR). Any type of binder usable in typical electrode fabrication may be utilized.

The binder may be used in an amount of 1~20 wt % based on the total weight of the mixture.

Figure 9:
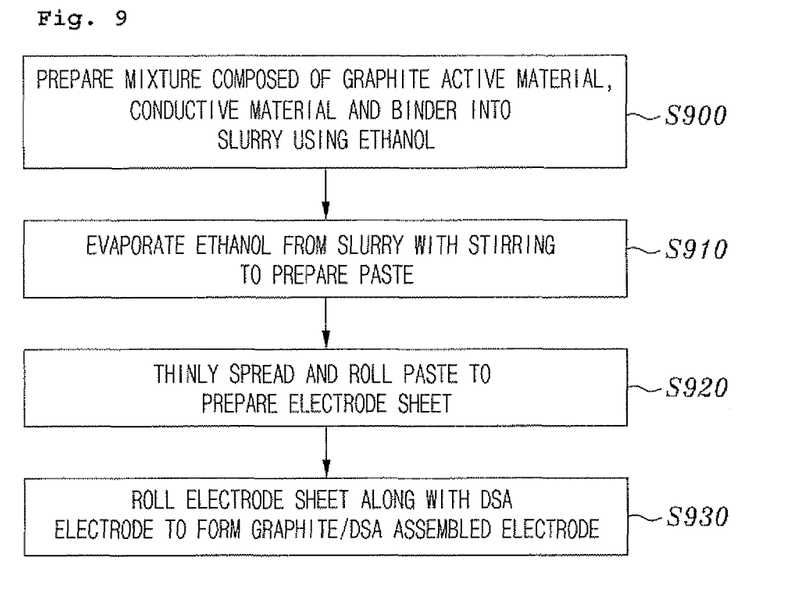
FIG. 9 shows a process of manufacturing the graphite/DSA assembled electrode for a redox flow battery according to the present invention.

FIG. 9 shows a process of manufacturing the graphite/DSA assembled electrode for a redox flow battery according to the present invention.

At S900, the alcohol used may include ethanol, methylalcohol, isopropyl alcohol, or an organic solvent blend of the above alcohol and acetone. In the case where an organic solvent blend is used, alcohol may be mixed with another organic solvent at a volume ratio of 50:50. The organic solvent blend may be used in an amount 0.5~10 times the weight amount of the mixture composed of the graphite, the conductive material and the binder.

Figure 10:
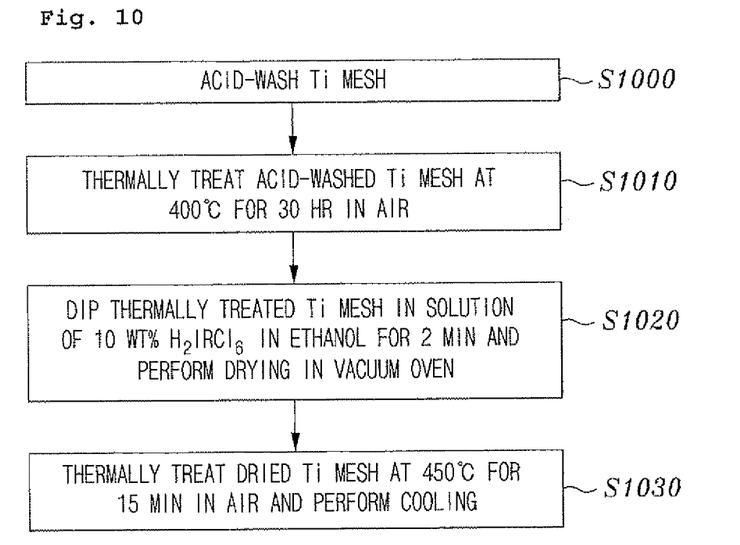
FIG. 10 shows a process of manufacturing a DSA electrode which may be used to manufacture the graphite/DSA assembled electrode for a redox flow battery according to the present invention.

In addition, the DSA electrode used in the present invention may be either a general DSA electrode or a DSA electrode manufactured using the process of FIG. 10.

The DSA electrode may result from S1000 to S1030 of FIG. 10.

Specifically, a titanium (Ti) mesh is first acid-washed with sulfuric acid or hydrochloric acid, and then thermally treated at 400° C. for 30 hours in an air atmosphere. Subsequently, the Ti mesh is subjected to a procedure including dipping for 2 min in a solution of 10 wt % $H_2IrCl_6$ in ethanol and drying in a vacuum oven, and then a procedure including thermal treatment at 450° C. for 15 min in an air atmosphere and cooling, after which these procedures are repeated eight times or so, thus obtaining the DSA electrode.

The Ti substrate may be made of an alloy material including Ti, and examples of an active material having electrochemical activity applied on the Ti substrate may include noble metals, including Ir, Ru, Ta, Pt, Au, Pd, In and the like, and oxides thereof.

The graphite/DSA assembled electrode obtained at S930 of FIG. 9 has a thickness of 50~200 μm, and does not have to be a DSA current collector. In lieu of the DSA current collector, foam of Cu, Ti, Al or Ni or mesh thereof may be used, and may be manufactured by roll-pressing a current collector.

The graphite/DSA assembled electrode according to the present invention may be utilized as an electrode of primary/secondary cells, metal-air fuel cells, super-capacitors, and other systems requiring electrodes having high durability and corrosion resistance.

A better understanding of the present invention may be obtained via the following examples which are set forth to illustrate, but are not to be construed as limiting the present invention.

Example 1

9 g of 10 μm sized artificial graphite particles (MCMB 1028, Osaka Gas), 0.5 g of a conductive material Denka Black (DB, water content: 0.06 wt %, ash content: 0.02 wt %, apparent density 0.128 g/cm$^3$, compression ratio: 100%, Denka Corp.), 0.5 g of PTFE and 10 g of ethanol were mixed, uniformly stirred at room temperature, and then kneaded while evaporating ethanol to prepare a paste, which was then made into a sheet.

The electrode sheet thus obtained was rolled to a thickness of 200 μm, and then further rolled with a DSA electrode, thus manufacturing a graphite/DSA assembled electrode. The potential-current cycle properties of the electrode thus manufactured were measured depending on the scan rate in an electrolytic solution including 2 M $VOSO_4$ and 2.5 M $H_2SO_4$ and an electrolytic solution including 1 M $VOSO_4$ and 5 M $H_2SO_4$. The reference electrode and the counter electrode were a saturated calomel electrode (SCE) and a Pt gauze electrode, respectively.

Example 2

8.5 g of 10 μm sized artificial graphite particles (MCMB 1028, Osaka Gas), 1 g of a conductive material KS6, 0.5 g of PTFE and 10 g of ethanol were mixed, uniformly stirred at room temperature, and then kneaded while evaporating ethanol to prepare a paste, which was then made into a sheet.

The electrode sheet thus obtained was rolled to a thickness of 200 µm, and then further rolled with a DSA electrode, thus manufacturing a graphite/DSA assembled electrode.

The potential-current cycle properties of the electrode thus manufactured were measured depending on the scan rate in an electrolytic solution including 2 M $VOSO_4$ and 2.5 M $H_2SO_4$ and an electrolytic solution including 1 M $VOSO_4$ and 5 M $H_2SO_4$. The reference electrode and the counter electrode were SCE and a Pt gauze electrode, respectively.

Example 3

9 g of 18 µm sized natural graphite particles, 0.5 g of Denka Black (DB, water content: 0.06 wt %, ash content: 0.02 wt %, apparent density 0.128 g/cm$^3$, compression ratio: 100%, Denka Corp.), 0.5 g of PTFE and 10 g of ethanol were mixed, uniformly stirred at room temperature, and then kneaded while evaporating ethanol to prepare a paste, which was then made into a sheet.

The electrode sheet thus obtained was rolled to a thickness of 200 µm, and then further rolled with a DSA electrode, thus manufacturing a graphite/DSA assembled electrode.

The potential-current cycle properties of the electrode thus manufactured were measured depending on the scan rate in an electrolytic solution including 2 M $VOSO_4$ and 2.5 M $H_2SO_4$ and an electrolytic solution including 1 M $VOSO_4$ and 5 M $H_2SO_4$. The reference electrode and the counter electrode were SCE and a Pt gauze electrode, respectively.

Comparative Example 1

The potential-current cycle properties of a graphite electrode commercially available for a lithium secondary cell were measured depending on the scan rate in an electrolytic solution including 1 M $VOSO_4$ and 5 M $H_2SO_4$. The reference electrode and the counter electrode were SCE and a Pt gauze electrode, respectively.

Comparative Example 2

The potential-current cycle properties of a DSA electrode were measured depending on the scan rate in an electrolytic solution including 1 M $VOSO_4$ and 5 M $H_2SO_4$. The reference electrode and the counter electrode were SCE and a Pt gauze electrode, respectively.

Figure 1:
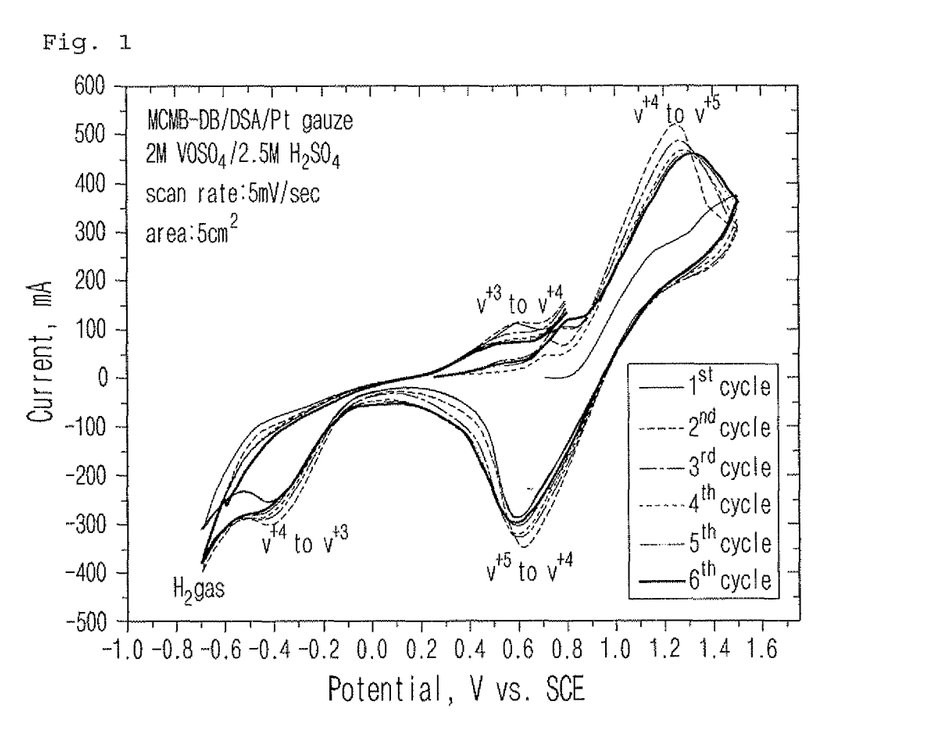
FIG. 1 shows potential-current cycle curves of a cell including an artificial graphite/DSA assembled electrode according to the present invention and a Pt gauze electrode in a 2 M $VOSO_4$/2.5 M $H_2SO_4$ electrolytic solution.

FIG. 1 shows the potential-current cycle curves of a half cell, which was manufactured from the artificial graphite/DSA assembled electrode of Example 1 and a Pt gauze electrode, in an electrolytic solution composed of 2 M $VOSO_4$ and 2.5 M $H_2SO_4$. As shown in FIG. 1, $V^{+4}$ ions are oxidized to $V^{+5}$ near 1.2 V vs. SCE potential, and the oxidized $V^{+5}$ ions are reduced again to $V^{+4}$ near 0.6 V vs. SCE potential.

The reduced $V^{+4}$ ions are further reduced to $V^{+3}$ ions near −0.3 V vs. SCE, after which $V^{+3}$ is oxidized again to $V^{+4}$ ions near 0.6 V vs. SCE. This cell exhibits a typical redox couple reaction.

As the reaction rate progresses more rapidly from the second cycle, the stable redox couple reaction takes place up to the sixth cycle.

Thus, in the case where the artificial graphite/DSA assembled electrode manufactured according to the present invention is applied to a redox flow battery, high power density and energy efficiency may be obtained.

Figure 2:
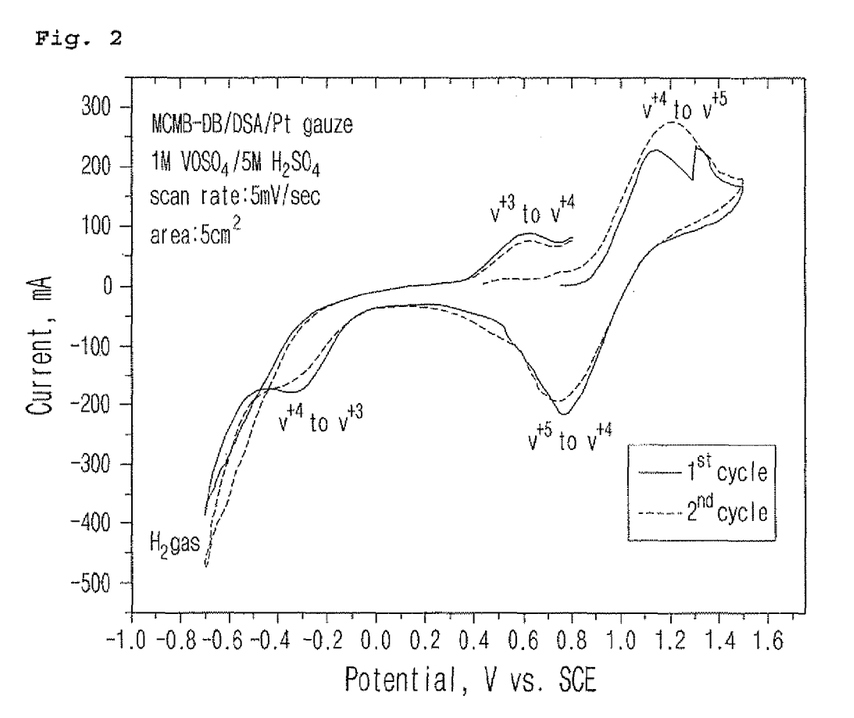
FIG. 2 shows potential-current cycle curves of a cell including an artificial graphite/DSA assembled electrode according to the present invention and a Pt gauze electrode in a 1 M $VOSO_4$/5 M $H_2SO_4$ electrolytic solution.

FIG. 2 shows the potential-current cycle curves when using the electrode of Example 1 in an electrolytic solution composed of 1 M $VOSO_4$ and 5 M $H_2SO_4$. As shown in FIG. 2, the redox couple reaction of V ions occurs near the potential similar to the results of Example 1, but the total reaction rate becomes slower compared to when in the electrolytic solution composed of 2 M $VOSO_4$ and 2.5 M $H_2SO_4$.

These results show that the energy density of the redox flow battery depends on the concentration of the electrolytic solution and that the electrode according to the present invention is able to be used at a wider range of concentrations of the electrolytic solution.

Figure 3:
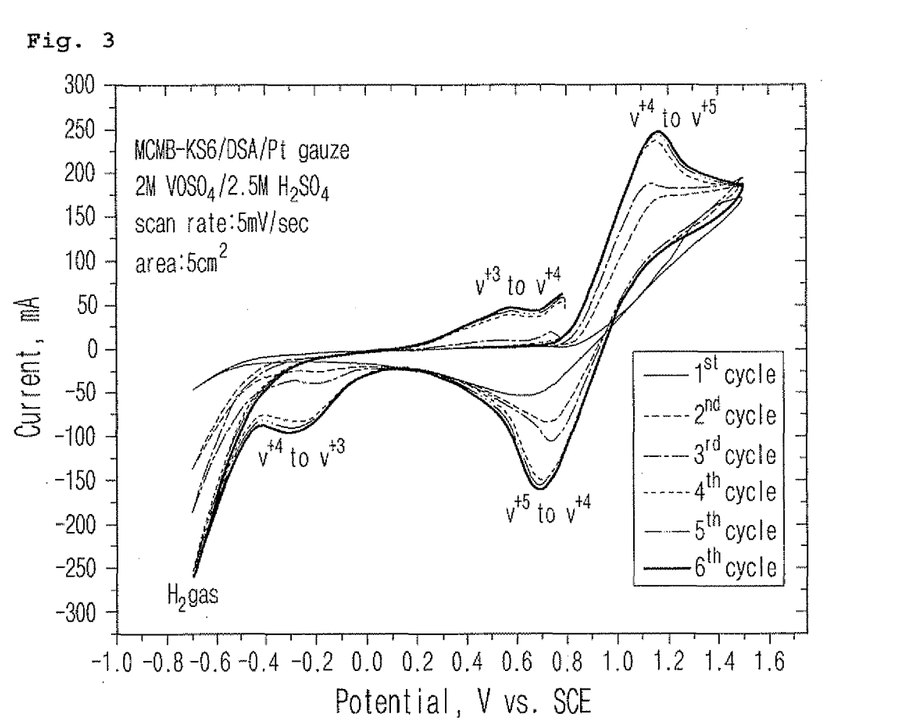
FIG. 3 shows potential-current cycle curves of a cell including an artificial graphite/DSA assembled electrode according to the present invention and a Pt gauze electrode in a 2 M $VOSO_4$/2.5 M $H_2SO_4$ electrolytic solution.

FIG. 3 shows the potential-current cycle curves of a half cell, which was manufactured as in Example 1 using the artificial graphite/DSA assembled electrode of Example 2, in an electrolytic solution composed of 2 M $VOSO_4$ and 2.5 M $H_2SO_4$. As shown in FIG. 3, $V^{+4}$ ions are oxidized to $V^{+5}$ near 1.2 V vs. SCE potential, and the oxidized $V^{+5}$ ions are reduced again to $V^{+4}$ ions near 0.7 V vs. SCE potential.

Although the reversibility of the reaction is better than when using the electrode of Example 1, the reaction rate is slower and increases at the second cycle. The redox couple reaction is insignificant at the first cycle. This is considered to be due to wettability of the electrode.

Figure 4:
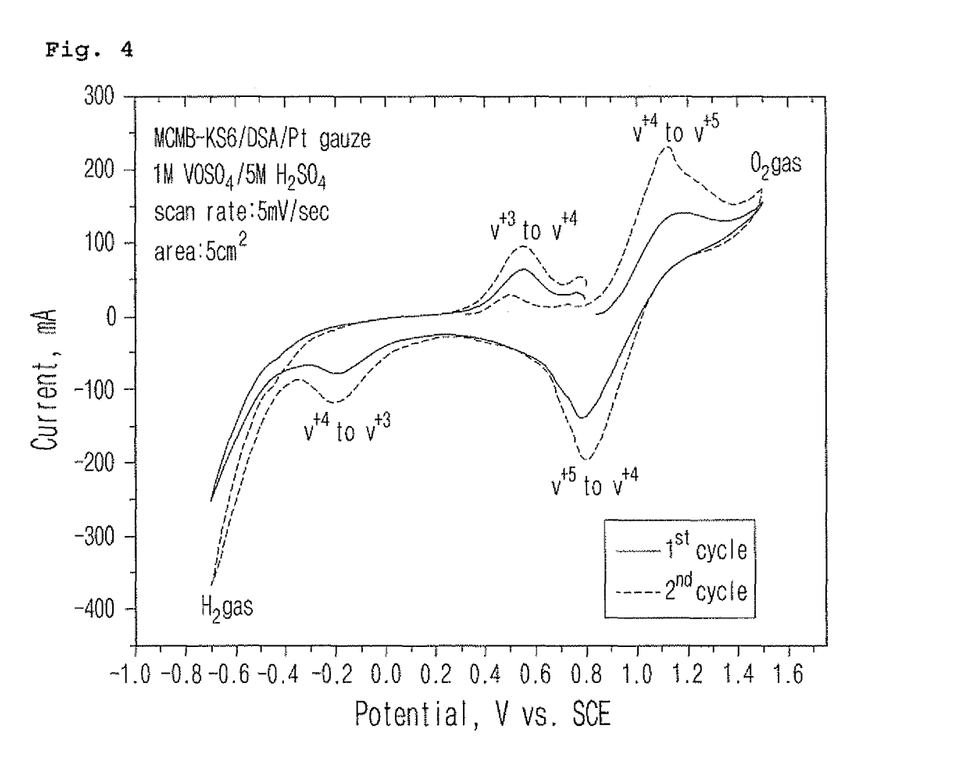
FIG. 4 shows potential-current cycle curves of a cell including an artificial graphite/DSA assembled electrode according to the present invention and a Pt gauze electrode in a 1 M $VOSO_4$/5 M $H_2SO_4$ electrolytic solution.

FIG. 4 shows the potential-current cycle curves of a half cell, which was manufactured as in Example 1 using the artificial graphite/DSA assembled electrode of Example 2, in an electrolytic solution composed of 1 M $VOSO_4$ and 5 M $H_2SO_4$.

As shown in FIG. 4, $V^{+4}$ ions are oxidized to $V^{+5}$ near 1.05 V vs. SCE potential, and the oxidized $V^{+5}$ ions are reduced again to $V^{+4}$ ions near 0.85 V vs. SCE potential.

Although the total reaction reversibility is better than when using the electrode of Example 1, the redox couple reaction is insignificant at the first cycle attributed to the wettability of the electrode, and the reaction rate becomes similar to that of Example 1 from the second cycle.

Figure 5:
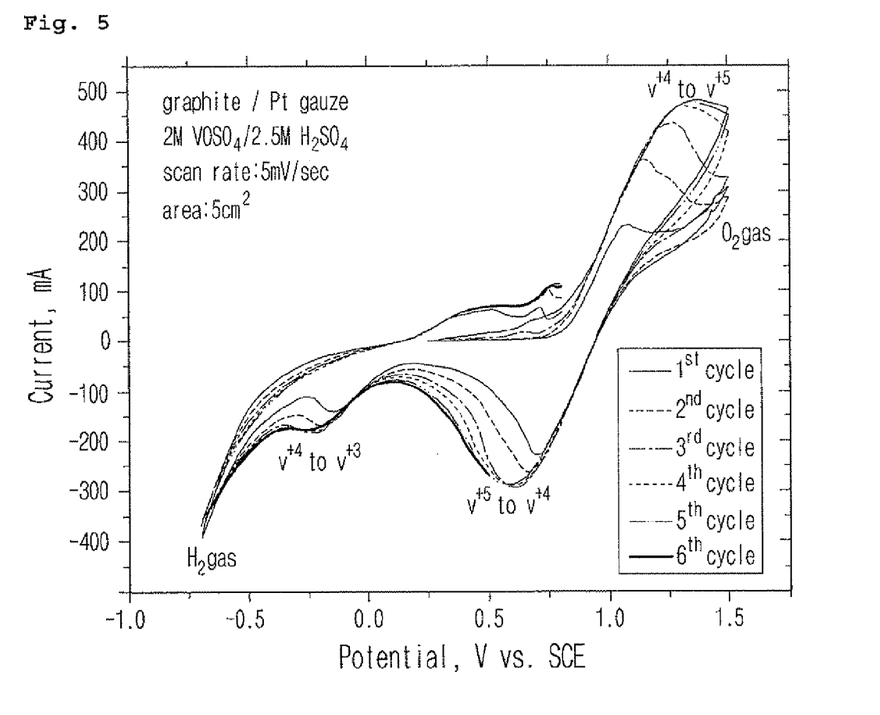
FIG. 5 shows potential-current cycle curves of a cell including a natural graphite/DSA assembled electrode according to the present invention and a Pt gauze electrode in a 2 M $VOSO_4$/2.5 M $H_2SO_4$ electrolytic solution.

FIG. 5 shows the potential-current cycle curves of a half cell, which was manufactured as in Example 1 using the natural graphite/DSA assembled electrode of Example 3, in an electrolytic solution composed of 2 M $VOSO_4$ and 2.5 M $H_2SO_4$. As shown in FIG. 5, $V^{+4}$ ions are oxidized to $V^{+5}$ near 1.25 V vs. SCE potential, and the oxidized $V^{+5}$ ions are reduced again to $V^{+4}$ ions near 0.7 V vs. SCE potential, like the artificial graphite electrode.

Although the reaction reversibility is worse than when using the electrode of Example 1, the reaction rate is faster and gradually increases from the second cycle and thus becomes stable at the sixth cycle. The redox couple reaction is also insignificant at the first cycle. This is considered to be due to the wettability of the electrode.

Figure 6:
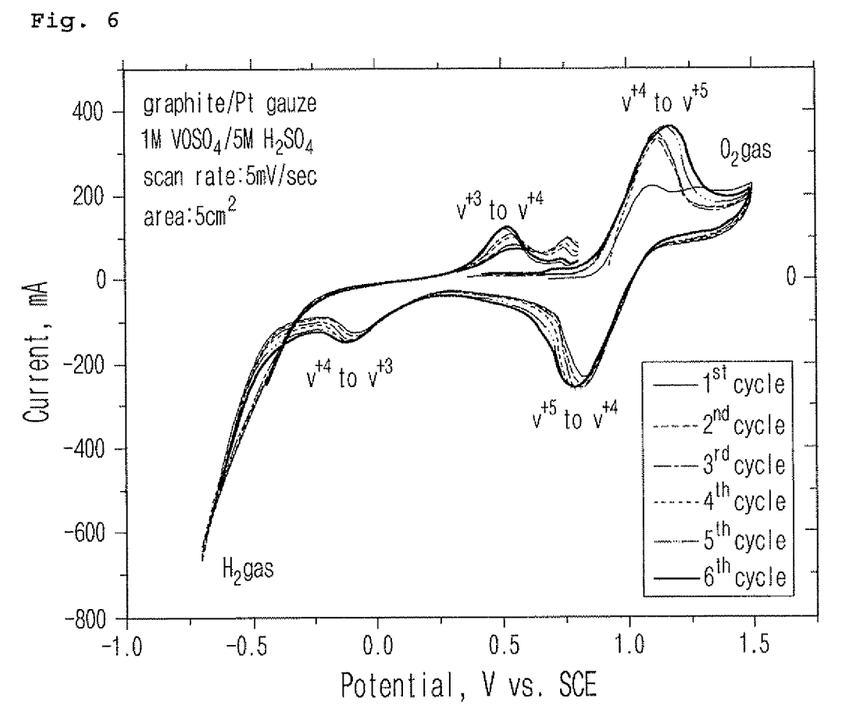
FIG. 6 shows potential-current cycle curves of a cell including a natural graphite/DSA assembled electrode according to the present invention and a Pt gauze electrode in a 1 M $VOSO_4$/5 M $H_2SO_4$ electrolytic solution.

FIG. 6 shows the potential-current cycle curves of a half cell, which was manufactured as in Example 1 using the natural graphite/DSA assembled electrode of Example 3, in an electrolytic solution composed of 1 M $VOSO_4$ and 5 M $H_2SO_4$. As shown in FIG. 6, the reaction reversibility is better than in the electrolytic solution composed of 2 M $VOSO_4$ and 2.5 M $H_2SO_4$, but the reaction rate is slower, and the redox couple reaction of $V^{+4}$ and $V^{+3}$ ions occurs effectively.

Figure 7:
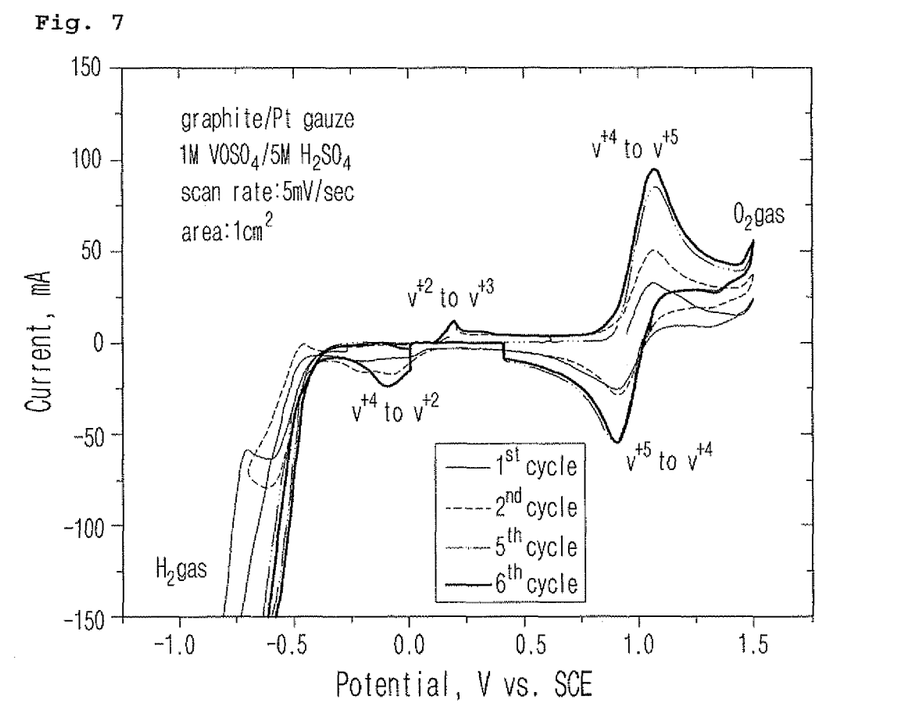
FIG. 7 shows potential-current cycle curves of a cell including a graphite electrode and a Pt gauze electrode in a 1 M $VOSO_4$/5 M $H_2SO_4$ electrolytic solution.

FIG. 7 shows the potential-current cycle curves of a half cell, which was manufactured as in Example 1 using the graphite electrode of Comparative Example 1, in an electrolytic solution composed of 1 M $VOSO_4$ and 5 M $H_2SO_4$.

As shown in FIG. 7, $V^{+4}$ ions are oxidized to $V^{+5}$ near 1.05 V vs. SCE potential, and the oxidized $V^{+5}$ ions are reduced again to $V^{+4}$ ions near 0.95 V vs. SCE potential.

Although the reaction reversibility is evaluated to be the best, the reaction rate is slightly lower compared to Examples 1 and 2.

As the cycle progresses, the reduction from $V^{+4}$ ions to $V^{+3}$ ions near −0.15 V vs. SCE potential and the oxidation from $V^{+3}$ ions to $V^{+4}$ ions near 0.20 V vs. SCE potential take place, and thus the redox couple reaction increases because of the wettability of the electrode.

Figure 8:
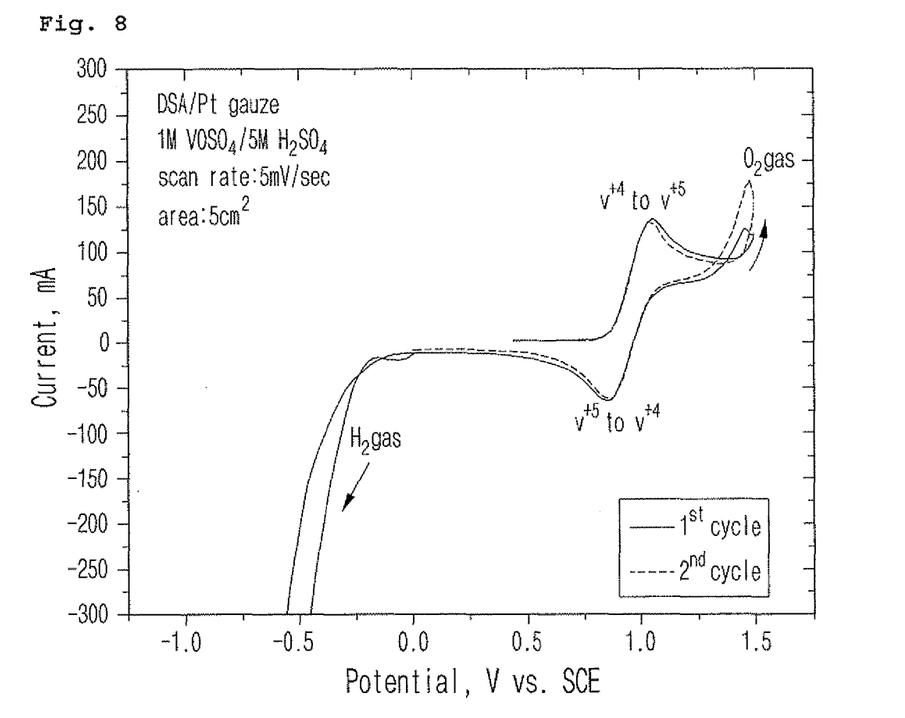
FIG. 8 shows potential-current cycle curves of a cell including a DSA electrode and a Pt gauze electrode in a 1 M $VOSO_4$/5 M $H_2SO_4$ electrolytic solution.

FIG. 8 shows the potential-current cycle curves when using the electrode of Comparative Example 2 in an electrolytic solution composed of 1 M $VOSO_4$ and 5 M $H_2SO_4$.

As shown in FIG. 8, the oxidation from $V^{+4}$ ions to $V^{+5}$ takes place near 1.05 V vs. SCE potential, and the oxidized $V^{+5}$ ions are reduced again to $V^{+4}$ ions near 0.85 V vs. SCE potential.

The reaction reversibility is evaluated to be superior but the total reaction rate is low due to the decrease in the specific surface area of the electrode.

As described hereinbefore, the present invention provides a graphite/DSA assembled electrode for a redox flow battery, a method of manufacturing the same and a redox flow battery including the same. In the case where the graphite/DSA assembled electrode for a redox flow battery according to the present invention is applied to a redox flow battery, high power density and energy efficiency can be obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a graphite/dimensionally-stablilized-anode (DSA) assembled electrode for a redox flow battery, comprising:
   preparing a mixture comprising a graphite active material, a conductive material and a binder into a slurry using an alcohol;
   evaporating the alcohol from the slurry, thus preparing a paste;
   thinly spreading the paste, thus preparing an electrode sheet; and
   rolling the electrode sheet along with a DSA electrode, thus obtaining the qraphite/DSA assembled electrode,
   wherein the DSA electrode is manufactured by:
   acid-washing a titanium mesh with sulfuric acid or hydrochloric acid;
   thermally treating the titanium mesh, which was acid-washed, at 400° C. for 30 hours in air;
   dipping the titanium mesh, which was thermally treated, in a solution of 10 wt % $H_2IrCl_6$ in ethanol for 2 min and performing drying in a vacuum oven; and
   thermally treating the titanium mesh, which was dried, at 450° C. for 15 min in air and performing cooling.

2. The method as set forth in claim 1, wherein the graphite active material comprises spherical graphite particles, lamellar graphite particles, fiber-shaped graphite particles, or flaky graphite, each of which has electrochemical activity.

3. The method as set forth in claim 1, wherein the graphite active material has a size ranging from 100 nm to 100 um.

4. The method as set forth in claim 1, wherein the conductive material comprises carbon black, carbon nanotubes, graphene, black, acetylene black, super-P, or particulate graphite including KS6, sfg6.

5. The method as set forth in claim 1, wherein the binder comprises polytetrafluoroethylene (PTFE), polyvinylidene difluoride (PVdF), carboxy methylcellulose (CMC), polyvinylalcohol (PVA) or styrene butadiene rubber (SBR).

6. The method as set forth in claim 1, wherein the conductive material is used in an amount of 1-50 wt %, and the binder used in an amount of 1-20 wt %.

7. The method as set forth in claim 1, wherein the alcohol comprises ethanol, methylalcohol, isopropylalcohol, or an organic solvent blend of the ethanol, methylalcohol, or isopropylalcohol and acetone.

8. The method as set forth in claim 7, wherein the alcohol and another organic solvent of the organic solvent blend are mixed at a volume ratio 50:50.

9. The method as set forth in claim 7, wherein the organic solvent blend is used in an amount 0.5~10 times the weight amount of the mixture comprising the graphite active material, the conductive material and the binder.

10. The method as set forth in claim 1, wherein the DSA electrode is a titanium mesh substrate which is coated with a material having electrochemical activity, including a noble metal including iridium, ruthenium, tantalum, platinum, gold, palladium or indium or an oxide thereof.

11. The method as set forth in claim 10, wherein the dipping the titanium mesh and performing drying and the thermally treating the titanium mesh and performing cooling are repeated eight times, thus manufacturing the DSA electrode.

12. A graphite/DSA assembled electrode for a redox flow battery, manufactured using the method claim 1.

13. A redox flow battery using the electrode of claim 12.

14. A method of manufacturing a graphite/dimensionally-stablilized-anode (DSA) assembled electrode for a redox flow battery, comprising:
   preparing a mixture comprising a micro-sized graphite, carbon black, and polytetrafluoroethylene (PTFE) into a slurry using an alcohol;
   evaporating the alcohol from the slurry, thus preparing a paste;
   thinly spreading the paste, thus preparing an electrode sheet; and
   rolling the electrode sheet along with a DSA electrode, thus obtaining the graphite/DSA assembled electrode,
   wherein the DSA electrode is manufactured by:
   acid-washing a titanium mesh with sulfuric acid or hydrochloric acid;
   thermally treating the titanium mesh, which was acid-washed, at 400° C. for 30 hours in air;
   dipping the titanium mesh, which was thermally treated, in a solution of 10 wt % $H_2IrCl_6$ in ethanol for 2 min and performing drying in a vacuum oven; and
   thermally treating the titanium mesh, which was dried, at 450° C. for 15 min in air and performing cooling.

* * * * *